US012681689B2

(12) United States Patent
Kim et al.

(10) Patent No.: US 12,681,689 B2
(45) Date of Patent: Jul. 14, 2026

(54) ELECTRONIC DEVICE AND CONTROLLING METHOD OF ELECTRONIC DEVICE

(71) Applicant: Samsung Electronics Co., Ltd., Suwon-si (KR)

(72) Inventors: Jeongseop Kim, Suwon-si (KR); Minsung Jung, Suwon-si (KR); Dongjae Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 18/582,154

(22) Filed: Feb. 20, 2024

(65) Prior Publication Data

US 2024/0220196 A1      Jul. 4, 2024

Related U.S. Application Data

(63) Continuation of application No. PCT/KR2023/020622, filed on Dec. 14, 2023.

(30) Foreign Application Priority Data

Dec. 29, 2022      (KR) ........................ 10-2022-0189262

(51) Int. Cl.
*G10L 15/22* (2006.01)
*G06F 3/16* (2006.01)
*G10L 15/26* (2006.01)

(52) U.S. Cl.
CPC .............. *G06F 3/167* (2013.01); *G10L 15/22* (2013.01); *G10L 15/26* (2013.01); *G10L 2015/223* (2013.01)

(58) Field of Classification Search
CPC ......... G10L 15/22; G10L 15/24; G06F 3/167; G06F 40/35
See application file for complete search history.

(56) References Cited

U.S. PATENT DOCUMENTS 8,977,971 B2      3/2015   Singh et al.
9,711,149 B2      7/2017   Han et al.
(Continued)

FOREIGN PATENT DOCUMENTS

CN      111475241 A      7/2020
EP      3828692 A1 *    6/2021    ........... G06Q 10/087
(Continued)

OTHER PUBLICATIONS

International Search Report dated Mar. 19, 2024, issued in International Application No. PCT/KR2023/020622.
(Continued)

*Primary Examiner* — Daniel Abebe
(74) *Attorney, Agent, or Firm* — Jefferson IP Law, LLP

(57)      ABSTRACT

An electronic device and a method of controlling the electronic device are provided. The electronic device includes a microphone, a display, memory, and a processor configured to obtain, based on a user voice being received through the microphone while a first user interface (UI) screen is being displayed, text information corresponding to the user voice by inputting the user voice, obtain first information including information on a command and information on an execution target of the command included in the text information, obtain second information including information on functions corresponding to the plurality of objects and information on texts included in the plurality of objects, identify whether a target object corresponding to the user voice is present from among the plurality of objects, and control the display to display a second UI screen corresponding to the target object for performing an operation corresponding to the command.

18 Claims, 9 Drawing Sheets

(56)    References Cited

U.S. PATENT DOCUMENTS

| | | | |
|---|---|---|---|
| 9,934,782 B2 | 4/2018 | Zohar et al. | |
| 10,360,288 B2 | 7/2019 | Zhang et al. | |
| 10,489,126 B2 | 11/2019 | Kumar et al. | |
| 10,656,907 B2 * | 5/2020 | Seolas | G06F 40/35 |
| 2012/0209608 A1 | 8/2012 | Lee | |
| 2012/0215543 A1 | 8/2012 | Oz et al. | |
| 2014/0270258 A1 * | 9/2014 | Wang | G06F 3/167 |
| | | | 381/110 |
| 2017/0084273 A1 | 3/2017 | Zohar et al. | |
| 2021/0326245 A1 | 10/2021 | Arbon et al. | |
| 2022/0035514 A1 * | 2/2022 | Shin | G06Q 10/087 |
| 2022/0093098 A1 * | 3/2022 | Samal | G06N 3/042 |
| 2022/0404956 A1 | 12/2022 | Choi et al. | |

FOREIGN PATENT DOCUMENTS

| | | | | |
|---|---|---|---|---|
| EP | 3 955 244 A1 | 2/2022 | | |
| JP | 2018-537795 A | 12/2018 | | |
| KR | 10-2012-0090151 A | 8/2012 | | |
| KR | 10-2012-0093597 A | 8/2012 | | |
| KR | 10-1505127 B1 | 3/2015 | | |
| KR | 10-2367132 B1 | 2/2022 | | |
| KR | 10-2022-0040997 A | 3/2022 | | |
| WO | WO-2020119569 A1 * | 6/2020 | | G10L 15/18 |

OTHER PUBLICATIONS

Wikipedia; Node graph architecture; XP093266561; https://en.
wikipedia.org/w/index.php?title=Node_graph_architecture&oldid=
1076164113; Mar. 9, 2022.
Extended European Search Report dated Nov. 7, 2025; European
Appln. No. 23912694.9-1218 / 4586074 PCT/KR2023020622.

* cited by examiner

FIG. 3

ELECTRONIC DEVICE AND CONTROLLING METHOD OF ELECTRONIC DEVICE

CROSS-REFERENCE TO RELATED APPLICATION(S)

This application is a continuation application, claiming priority under § 365(c), of an International application No. PCT/KR2023/020622, filed on Dec. 14, 2023, which is based on and claims the benefit of a Korean patent application number 10-2022-0189262, filed on Dec. 29, 2022, in the Korean Intellectual Property Office, the disclosure of which is incorporated by reference herein in its entirety.

TECHNICAL FIELD

The disclosure relates to an electronic device and a method of controlling the same. More particularly, the disclosure relates to an electric device which can perform voice control matching a user intent and a method of controlling thereof.

BACKGROUND ART

Recently, with developments in technology associated with artificial intelligence, technology that controls an electronic device based on a user voice is being focused on. More particularly, developments in technology which controls operation associated with a user interface (UI) object by inputting the user voice rather than a touch interaction while a user interface (UI) screen provided by an application in the display is in a displayed state are being more accelerated.

However, in the case of an application in which an application programming interface (API) associated with voice control is provided, it may be easy to perform an operation corresponding to the user voice based on the provided API or display a UI screen corresponding to the user voice, but there may be a problem of voice control not being easy for applications in which the API associated with voice control is not provided.

Accordingly, there is a growing need for technology that can perform voice control which matches the user intent by effectively constructing a UI graph which can show attributes per UI screen.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device which can perform voice control matching a user intent using a user interface (UI) graph and a method of controlling thereof.

Additional aspects will be set forth in part in the description which follows and, in part, will be apparent from the description, or may be learned by practice of the presented embodiments.

In accordance with an aspect of the disclosure, an electronic device is provided. The electronic device includes a microphone, a display, memory, and a processor configured to obtain, based on a user voice being received through the microphone while a first UI screen including a plurality of objects is being displayed on the display, text information corresponding to the user voice by inputting the user voice to a voice recognition model, obtain, based on the text information, first information including information on a command and information on an execution target of the command included in the text information, obtain, based on metadata on the first UI screen, second information including information on functions corresponding to the plurality of objects and information on texts included in the plurality of objects, identify, based on a comparison result between the first information and the second information, whether a target object corresponding to the user voice is present from among the plurality of objects, and control, based on the target object being identified, the display to display a second UI screen corresponding to the target object for performing an operation corresponding to the command.

The processor is configured to identify, based on the information on the execution target corresponding to a first text included in the plurality of objects, the object included with the first text from among the plurality of objects as the target object.

The processor is configured to identify, based on the information on the execution target corresponding to a second text included in the plurality of objects, and the command corresponding to one function from among a plurality of functions corresponding to the plurality of objects, an object corresponding to the one function from among the plurality of objects as the target object.

The processor is configured to control, based on the target object not being identified, the display to maintain displaying of the first UI screen.

The processor is configured to control, based on the target object not being identified, the display to display a third UI screen for performing an operation corresponding to the command.

The processor is configured to identify a variable area in which information displayed within the first UI screen is changed and a constant area which is different from the variable area based on the metadata, and obtain the second information from at least one object included in the constant area.

In the memory, a UI graph including a plurality of nodes corresponding to a type of a plurality of UI screens and a plurality of edges showing a connection relationship between the plurality of nodes according to an operation performed by a conversion between the plurality of UI screens is stored for each application, and the processor is configured to obtain, based on the target object being identified, a first embedding vector corresponding to the second information based on the metadata on the first UI screen, identify a first node corresponding to the first UI screen from among the plurality of nodes based on the comparison result between the first information and the second information and a comparison result between the first embedding vector corresponding to the second information and a second embedding vector corresponding to the plurality of nodes, respectively, identify, based on the information on the command and the information on the execution target of the command, a second node for performing an operation corresponding to the command from among at least one node which is connected to the first node, and control the display to display the second UI screen corresponding to the second node.

In accordance with another aspect of the disclosure, a method of controlling an electronic device is provided. The method includes obtaining, based on a user voice being received while a first UI screen including a plurality of objects is displayed on a display of the electronic device, text information corresponding to the user voice by inputting the user voice in a voice recognition model, obtaining, based on the text information, first information including information on a command and information on an execution target of the command included in the text information, obtaining, based on metadata on the first UI screen, second information including information on functions corresponding to the plurality of objects and information on texts included in the plurality of objects, identifying, based on a comparison result between the first information and the second information, whether a target object corresponding to the user voice is present from among the plurality of objects, and controlling, based on the target object being identified, the display to display a second UI screen corresponding to the target object for performing an operation corresponding to the command.

The identifying whether the target object is present includes identifying, based on the information on the execution target corresponding to a first text included in the plurality of objects, an object included with the first text from among the plurality of objects as the target object.

The identifying whether the target object is present includes identifying, based on the information on the execution target corresponding to a second text included in the plurality of objects, and the command corresponding to one function from among a plurality of functions corresponding to the plurality of objects, an object corresponding to the one function from among the plurality of objects as the target object.

The method of controlling the electronic device includes controlling, based on the target object not being identified, the display to maintain displaying of the first UI screen.

The method of controlling the electronic device includes controlling, based on the target object not being identified, the display to display a third UI screen for performing an operation corresponding to the command.

The obtaining the second information includes identifying a variable area in which information displayed within the first UI screen is changed and a constant area which is different from the variable area based on the metadata, and obtaining the second information from at least one object included in the constant area.

The method of controlling the electronic device includes obtaining a UI graph including a plurality of nodes corresponding to a type of a plurality of UI screens and a plurality of edges showing a connection relationship between the plurality of nodes according to an operation performed by a conversion between the plurality of UI screens, obtaining, based on the target object being identified, a first embedding vector corresponding to the second information based on the metadata on the first UI screen, identifying a first node corresponding to the first UI screen from among the plurality of nodes based on the comparison result between the first information and the second information and a comparison result between the first embedding vector corresponding to the second information and a second embedding vector corresponding to the plurality of nodes, respectively, identifying, based on information on the command and information on the execution target of the command, a second node for performing an operation corresponding to the command from among at least one node which is connected to the first node, and controlling the display to display the second UI screen corresponding to the second node.

In accordance with another aspect of the disclosure, one or more non-transitory computer-readable storage media storing computer-executable instructions that, when executed by at least one processor of an electronic device, configure the electronic device to perform operations is provided. The method includes obtaining, based on a user voice being received while a first UI screen including a plurality of objects is displayed on a display of the electronic device, text information corresponding to the user voice by inputting the user voice in a voice recognition model, obtaining, based on the text information, first information including information on a command and information on an execution target of the command included in the text information, obtaining, based on metadata on the first UI screen, second information including information on functions corresponding to the plurality of objects and information on texts included in the plurality of objects, identifying, based on a comparison result between the first information and the second information, whether a target object corresponding to the user voice is present from among the plurality of objects, and controlling, based on the target object being identified, the display to display a second UI screen corresponding to the target object for performing an operation corresponding to the command.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 3, 4, and 5 are diagrams illustrating a process of identifying a target object from a user interface (UI) screen based on a comparison result between first information and second information according to various embodiments of the disclosure;

Throughout the drawings, it should be noted that like reference numbers are used to depict the same or similar elements, features, and structures.

BEST MODE

Figure 1:
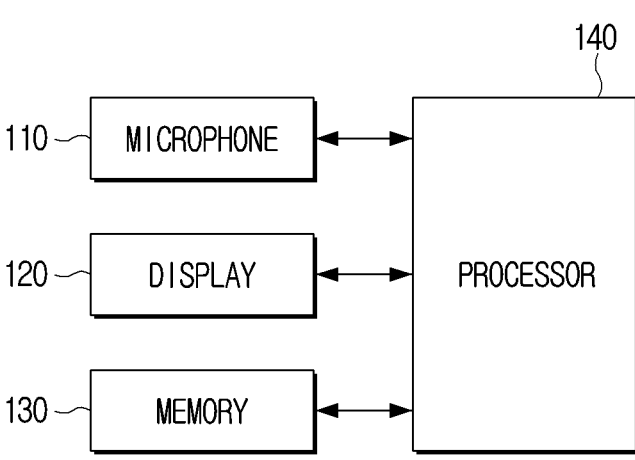
FIG. 1 is a block diagram illustrating a configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that singular forms "a," "an," and "the" include plural referents unless the context clearly dictates otherwise. Thus, for example, reference to "a component surface" includes reference to one or more of such surfaces.

In the disclosure, expressions, such as "have," "may have," "include," "may include," or the like are used to designate a presence of a corresponding characteristic (e.g., elements, such as numerical value, function, operation, or component), and not to preclude a presence or a possibility of additional characteristics.

In the disclosure, expressions, such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions, such as "first," "second," "1$^{st}$," "2$^{nd}$," and so on used herein may be used to refer to various elements regardless of order and/or importance. Further, it should be noted that the expressions are merely used to distinguish an element from another element and not to limit the relevant elements.

When a certain element (e.g., a first element) is indicated as being "(operatively or communicatively) coupled with/ to" or "connected to" another element (e.g., a second element), it may be understood as the certain element being directly coupled with/to the another element or as being coupled through other element (e.g., third element).

On the other hand, when a certain element (e.g., the first element) is indicated as "directly coupled with/to" or "directly connected to" another element (e.g., the second element), it may be understood as the other element (e.g., a third element) not being present between the certain element and the another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, the phrase "a sub-processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

The term "module" or "part" used in the embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor.

Meanwhile, the various elements and areas of the drawings have been schematically illustrated. Accordingly, the technical idea of the disclosure is not limited by relative sizes and distances illustrated in the accompanied drawings.

One or more embodiments according to the disclosure will be described with reference to the accompanying drawings below to aid in the understanding of those skilled in the art.

FIG. 1 is a block diagram illustrating a configuration of an electronic device according to an embodiment of the disclosure.

Figure 2:
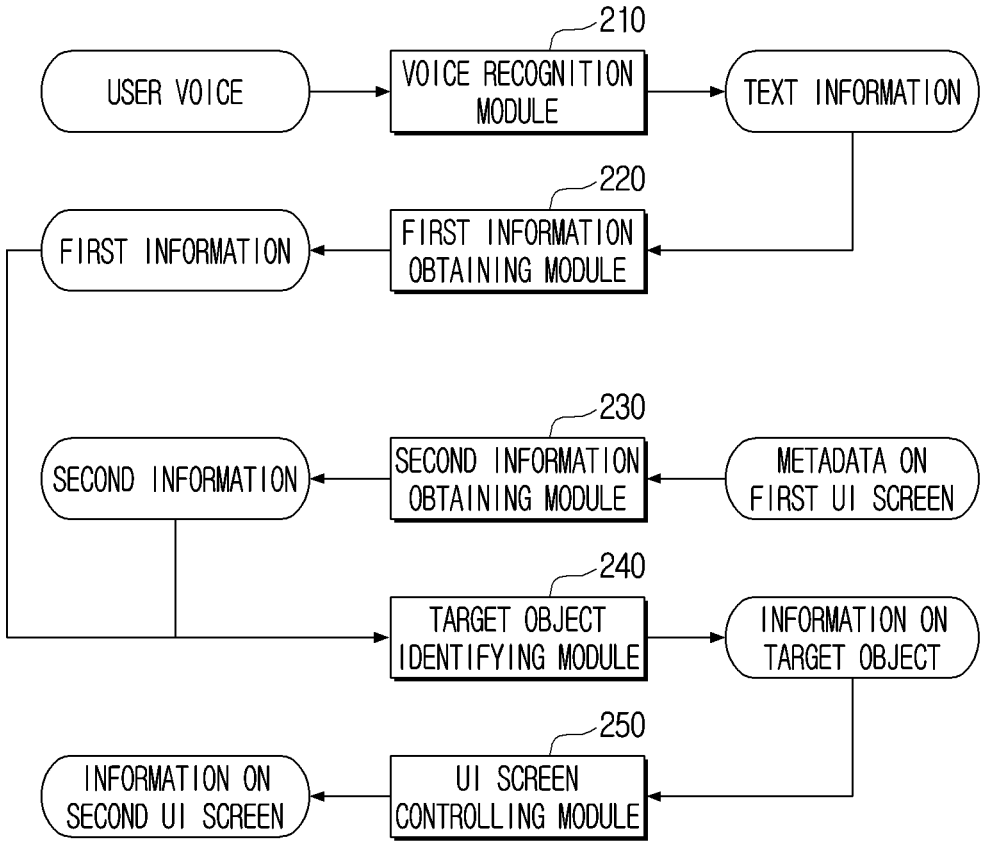
FIG. 2 is a block diagram illustrating a plurality of modules according to an embodiment of the disclosure.

FIG. 2 is a block diagram illustrating a plurality of modules according to an embodiment of the disclosure.

Referring to FIG. 1, an electronic device 100 according to one or more embodiments of the disclosure may include a microphone 110, a display 120, memory 130, and a processor 140.

The microphone 110 may obtain a sound or a signal for a voice generated outside of the electronic device 100. Specifically, the microphone 110 may obtain a sound or a vibration according to the voice generated outside of the electronic device 100, and convert the obtained vibration to an electric signal.

Specifically, the microphone 110 according to the disclosure may receive a user voice. For example, the microphone 110 may obtain a voice signal for the user voice generated by an utterance of a user, and the obtained signal may be converted to a signal of a digital form and stored in the memory 130. The microphone 110 may include an analog to digital converter (A/D converter), and may operate in association with the A/D converter positioned outside the microphone 110.

The display 120 may output image data by the control of the processor 140. Specifically, the display 120 may output an image pre-stored in the memory 130 by the control of the processor 140. The display 120 may be implemented as a liquid crystal display (LCD) panel, organic light emitting diodes (OLED), and the like, and the display 120 may also be implemented as a flexible display 120, a transparent display 120, and the like according to circumstance. However, the display 120 according to the disclosure is not limited to a specific type.

Specifically, the display 120 according to the disclosure may display a user interface (UI) screen for each of the applications stored in the memory 130. The display 120 may identify a target object corresponding to the user voice, and display a UI screen corresponding to the identified object to perform an operation according to the user voice.

In the memory 130, at least one instruction associated with the electronic device 100 may be stored. Further, an operating system (O/S) for driving the electronic device 100 may be stored in the memory 130. In addition, various software programs or applications for the electronic device

100 to operate according to various embodiments of the disclosure may be stored in the memory 130. Further, the memory 130 may include a semiconductor memory, such as flash memory, a magnetic storage medium, such as a hard disk, or the like.

Specifically, various software modules for the electronic device 100 to operate according to the various embodiments of the disclosure may be stored in the memory 130, and the processor 140 may control an operation of the electronic device 100 by executing various software modules stored in the memory 130. For example, the memory 130 may be accessed by the processor 140 and reading/writing/modifying/deleting/updating and the like of data may be performed by the processor 140.

Meanwhile, in the disclosure, the term 'memory 130' may be used as a meaning that includes the memory 130, read only memory (ROM) in the processor 140, random access memory (RAM), or a memory card (e.g., a micro secure digital (SD) card, a memory stick) mounted to the electronic device 100.

Specifically, according to the various embodiments of the disclosure, at least one instruction associated with the electronic device 100 may be stored in the memory 130. Specifically, a UI graph according to the disclosure may be stored for each application in the memory 130. Specifically, the UI graph may include a plurality of nodes corresponding to a type of a plurality of UI screens and a plurality of edges showing a connection relationship between the plurality of nodes according to an operation performed by a conversion between the plurality of UI screens.

For example, the UI graph may be a graph which shows 'information on UI screens' that is sequentially provided until a UI screen corresponding to a purpose of a user command is provided from a current UI screen as the plurality of nodes, and shows 'information on operations' that is sequentially performed until the UI screen corresponding to the purpose of the user command is provided from the current UI screen as the plurality of edges. For example, an operation shown by the plurality of edges may include an operation of clicking an object, an operation of activating a text input field, an operation for displaying information on the object, and the like.

Specifically, the plurality of nodes according to the disclosure may be divided based on a similarity of an embedding vector corresponding to respective UI screens and symbolic information represented by the plurality of objects included in the respective UI screens.

Here, the embedding vector may refer to a vector obtained based on metadata on a UI screen through a neural network model (e.g., a neural network encoder to be described below), and the symbolic information may be a concept in contrast with the embedding vector, and include information on texts of the plurality of objects included in the UI screen and information on functions of the plurality of objects. For example, the symbolic information may include first information, second information, and the like which will be described below. Further, the metadata may be provided by an application developer, and include UI screen for each application and information showing attributes for the objects of each of the UI screens.

For example, when dividing the plurality of nodes taking into consideration only the embedding vectors corresponding to each of the UI screens, a number of nodes included in a UI graph may increase countlessly, whereas when dividing the plurality of nodes taking into consideration only the symbolic information represented by the plurality of objects, it may become difficult to clearly identify the node matching the intent of the user command. Accordingly, the UI graph according to the disclosure may be generated taking into consideration the symbolic information included in the UI screen together with the embedding vector corresponding to the UI screen. A process of generating the UI graph according to the disclosure will be described with reference to FIG. 6.

The processor 140 may control the overall operation of the electronic device 100. Specifically, the processor 140 may be connected with configurations of the electronic device 100 which include the microphone 110, the display 120, and the memory 130, and control the overall operation of the electronic device 100 by executing at least one instruction stored in the memory 130 as described above.

The processor 140 may be implemented with various methods. For example, the processor 140 may be implemented as at least one from among an application specific integrated circuit (ASIC), an embedded processor, a microprocessor, a hardware control logic, a hardware finite state machine (FSM), and a digital signal processor (DSP). Meanwhile, the term 'the processor 140' in the disclosure may be used as a meaning which includes a central processing unit (CPU), a graphics processing unit (GPU), a microprocessor unit (MPU), and the like.

Specifically, according to the various embodiments of the disclosure, the processor 140 may control a UI screen according to the disclosure using a plurality of modules. Referring to FIG. 2, the plurality of modules may include a voice recognition module 210, a first information obtaining module 220, a second information obtaining module 230, a target object identifying module 240, and a UI screen controlling module 250. An example of the processor 140 implementing various embodiments according to the disclosure using the plurality of modules will be described below.

The processor 140 may receive the user voice through the microphone 110 while a first UI screen including the plurality of objects is being displayed on the display 120. Further, the processor 140 may obtain text information corresponding to the user voice by inputting the user voice in the voice recognition module 210.

Specifically, the voice recognition module 210 may refer to a module which can output text information corresponding to the input user voice, and the voice recognition module 210 may include a neural network model which is referred to as an automatic speech recognition (ASR).

The processor 140 may obtain, based on text information, first information including information on a command and information on an execution target of the command included in the text information. The 'first information' may refer to symbolic information included in the text information corresponding to the user voice, and specifically, include information on the command and information on the execution target of the command. The processor 140 may obtain first information by using the first information obtaining module 220.

Referring to FIG. 2, when text information is received from the voice recognition module 210, the first information obtaining module 220 may obtain information showing which command is included in the text information and information showing what the execution target of the identified command is from among a pre-defined plurality of commands, and transmit to the target object identifying module.

For example, if the first UI screen is a UI screen provided by a music application, and the text information corresponding to the user voice is "turn on LOVE DIVING," the processor 140 may obtain first information which includes information that the command corresponding to the text "turn on" is "PLAY" and the execution target of the command "PLAY" is "LOVE DIVING." Here, the command "PLAY" may be a command representing a playback of music, and "LOVE DIVING" which is the execution target of the command may be a title of a song which is the target of the playback of music.

A process of identifying a command included in the text information from the text information corresponding to the user voice may be performed by using a neural network model, also referred to as, natural language understanding (NLU), but is not limited thereto, and may be performed through a matching process of the pre-defined plurality of commands and the text information.

Meanwhile, the processor 140 may obtain, based on metadata on the first UI screen, second information including information on functions corresponding to the plurality of objects and information on the texts included in the plurality of objects. The 'second information' may refer to the symbolic information included in the first UI screen, and include information on functions corresponding to the plurality of objects and information on the texts included in the plurality of objects. The processor 140 may obtain the second information by using the second information obtaining module 230.

Referring to FIG. 2, when metadata on the first UI screen is input, the second information obtaining module 230 may obtain second information by analyzing attributes included in the first UI screen and extracting information on a plurality of functions corresponding to the plurality of objects and information on a plurality of texts included in the plurality of objects.

According to one or more embodiments of the disclosure, when a first object from among the plurality of objects include a text, the second information obtaining module 230 may identify the text included in the first object. In addition, when a second object from among the plurality of objects includes an icon, the second information obtaining module 230 may identify the text representing the function of the icon. Further, the processor 140 may obtain second information including the text included in the first object and the text corresponding to the icon of the second object.

For example, the first object from among the plurality of objects may be a text "LOVE DIVING," the second object may be an icon having a text attribute, such as a "playback button," and in addition to the above, the second information obtaining module 230 may obtain a text corresponding to the attributes of the objects included in the respective UI screens.

According to one or more embodiments of the disclosure, the processor 140 may identify a variable area and a constant area of the first UI screen based on metadata. Further, the processor 140 may obtain the second information from the at least one object included in the constant area. For example, the processor 140 may obtain the second information based only on the at least one object included in the constant area without considering the object included in the variable area of the first UI screen.

Here, the variable area may refer to an area in which information displayed within the UI screen may be changed, and the constant area may refer to an area in which information displayed within the UI screen is not changed. For example, if the first UI screen is a UI screen provided by a music application, an area which includes a list showing searched titles of music may be the variable area, and an area showing a title of music that is currently being played back may be the constant area.

The processor 140 may identify, based on a comparison result between the first information and the second information, whether a target object corresponding to the user voice is present from among the plurality of objects. Here, the 'target object' may refer to an object corresponding to an intent of the user who uttered the user voice from among the plurality of objects included in the first UI screen. The processor 140 may identify the target object using the target object identifying module 240.

Referring to FIG. 2, when the first information is received from the first information obtaining module 220 and the second information is received from the second information obtaining module 230, the target object identifying module 240 may identify the target object by comparing the information included in the first information and the second information, respectively, and transmit to the UI screen controlling module 250 by obtaining information on the identified target object.

Specifically, the target object identifying module 240 may identify the target object based on whether the information on the command and information on the execution target of the command included in the first information are a 'match' to the information on the function and information on the text included in the second information. The target object identifying module 240 may identify the target object based on whether the information on the command and the information on the execution target of the command included in the first information is 'included' in the information on the function and information on the text included in the second information. Furthermore, the target object identifying module 240 may identify the target object based on whether the information on the command and the information on the execution target of the command included in the first information is 'similar' with the information on the function and information on the text included in the second information. Here, whether or not it is similar may be identified using a pre-defined rule or a trained neural network model.

In addition, as described above, the processor 140 may identify the target object based on a combination of whether the information is a match, whether the information is included, and whether the information is similar, and in addition to the above, various rules for identifying the target object may also be applied.

According to one or more embodiments of the disclosure, if information on the execution target of the command corresponds to a first text included in the plurality of objects, the processor 140 may identify the first text from among the plurality of objects as the target object. In other words, the processor 140 may compare the execution target of the command included in the first information and only the text included in the second information and identify the target object.

For example, if the command included in the text information is "PLAY," and the execution target of the command "PLAY" is "LOVE DIVING," the processor 140 may identify an object included with the text "LOVE DIVING" as the target object without considering the command "PLAY" if the object included with the text "LOVE DIVING" is present from among the plurality of objects.

According to one or more embodiments of the disclosure, if information on the execution target of the command corresponds to the second text included in the plurality of objects, and the command corresponds to one function from among the plurality of functions corresponding to the plurality of objects, the processor 140 may identify the object corresponding to the one function as the target object. In other words, the processor 140 may compare the information on the execution target of the command included in the first information with the text included in the second information, and identify the target object by comparing the information on the command included in the first information with the information on the plurality of functions included in the second information.

For example, if the text information corresponding to the user voice is "turn on LOVE DIVING," and the command included in the text information is "PLAY" and the execution target of the command "PLAY" is "LOVE DIVING," the processor 140 may identify an object corresponding to the command "PLAY" as the target object if an object included with the text "LOVE DIVING" is present from among the plurality of objects of the first UI screen, and if an object corresponding to the command "PLAY" is present.

Alternatively, if the information on the execution target does not correspond to the second text from among the plurality of texts included in the plurality of objects, or if the command does not correspond to the plurality of functions corresponding to the plurality of objects, the processor 140 may identify as the target object not being present from among the plurality of objects.

For example, if the text information corresponding to the user voice is "turn on LOVE DIVING," and the command included in the text information is "PLAY" and the execution target of the command "PLAY" is "LOVE DIVING," the processor 140 may identify as the target object not being present from among the plurality of objects if the object included with the text "LOVE DIVING" is present, but the object corresponding to the command "PLAY" is not present from among the plurality of objects of the first UI screen.

If the target object is identified, the processor 140 may control the display 120 to display a second UI screen, which corresponds to the target object, and is for performing an operation corresponding to the command. Specifically, the processor 140 may control the UI screen being displayed on the display 120 by using the UI screen controlling module 250.

Referring to FIG. 2, when information on the target object is received from the target object identifying module 240, the UI screen controlling module 250 may identify the second UI screen to be displayed following the first UI screen, obtain information on the identified second UI screen, and control the display of the second UI screen.

A process of identifying the second UI screen to be displayed following the first UI screen may be performed based on a UI graph described below. As described in the above, in the memory 130, a UI graph including a plurality of nodes corresponding to a type of the plurality of UI screens and a plurality of edges showing a connection relationship between the plurality of nodes according to an operation performed by a conversion between the plurality of UI screens may be stored for each application.

If the target object is identified, the processor 140 may obtain a first embedding vector corresponding to the second information based on metadata on the first UI screen. Specifically, the first embedding vector may be obtained, based on metadata on the first UI screen being input, through a trained neural network model (e.g., a first embedding vector obtaining module which will be described below) to obtain the first embedding vector corresponding to the second information. Meanwhile, the processor 140 may obtain a second embedding vector showing attributes of the plurality of nodes included in the UI graph. Here, the second embedding vector may be pre-stored in the memory 130 like the information on the UI graph.

The processor 140 may identify a first node corresponding to the first UI screen from among the plurality of nodes based on the comparison result between the first information and the second information and a comparison result between the first embedding vector and the second embedding vector.

According to one or more embodiments of the disclosure, the processor 140 may identify, based on the target object corresponding to the user voice being identified as present from among the plurality of objects based on a comparison between the first information corresponding to the user voice and the second information, and a node having the second embedding vector with a similarity with the first embedding vector being greater than or equal to a pre-set threshold value being identified from among the plurality of nodes based on a comparison of the first embedding vector and the second embedding vector, the identified node as the first node corresponding to the first UI screen. In other words, the processor 140 may not only compare the embedding vector but also the symbolic information together therewith, and identify the first node corresponding to the first UI screen currently displayed on the display 120 from among the plurality of nodes included in the UI graph.

Thereafter, the processor 140 may identify, based on information on the command and information on the execution target of the command, a second node for performing an operation corresponding to the command from among at least one node which is connected to the first node, and control the display 120 to display the second UI screen corresponding to the second node.

Specifically, the processor 140 may identify at least one sequence which can reach from the first node until a goal node corresponding to a target of the user voice, and identify, based on the information on the command and the information on the execution target of the command, the second node by identifying an edge corresponding to an operation corresponding to a command according to the user voice from among at least one node which is connected to the first node.

For example, if an object included with the text "LOVE DIVING" which is the execution target of the command is present, and if an object corresponding to the command "PLAY" is present from among the plurality of objects of the first UI screen, the processor 140 may perform the function of the object corresponding to the command "PLAY," and control the display 120 to change and display the first UI screen to the second UI screen including information showing that music is being played back.

Meanwhile, if the target object is not identified, the processor 140 may control the display 120 to maintain displaying of the first UI screen. For example, if an object included with the text "LOVE DIVING" which is the execution target of the command is present, and if an object corresponding to the command "PLAY" is not present from among the plurality of objects of the first UI screen, the above may be when the playing back of the music "LOVE DIVING" is already being performed in the first UI screen, that is, when the target of the command is already achieved. Accordingly, in this case, the processor 140 may control the display 120 to maintain the displaying of the first UI screen.

Meanwhile, if the target object is not identified, the processor 140 may control the display 120 to display a third UI screen for performing an operation corresponding to the command. For example, if an object included with the text "LOVE DIVING" which is the execution target of the command is present, and an object corresponding to the command "PLAY" is not present from among the plurality of objects of the first UI screen, the processor 140 may control the display 120 to display the third UI screen including the object corresponding to the command "PLAY," and then achieve the target of the command by performing an operation of clicking the object corresponding to the command "PLAY."

According to one or more embodiments described above, the electronic device 100 may clearly identify the target object corresponding to the user voice in a UI screen that is currently being displayed by comparing the first information obtained from the user voice and the second information obtained from the UI screen that is currently being displayed, and perform a voice control matching user intent.

Specifically, according to the disclosure, even for applications in which an application programming interface (API) related to voice control is not provided, voice control for the UI screen which is currently being displayed may be possible by obtaining the embedding vector and the symbolic information based on the metadata on the application above, and by comparing the above with the embedding vector and the symbolic information corresponding to the user voice.

Figure 3:
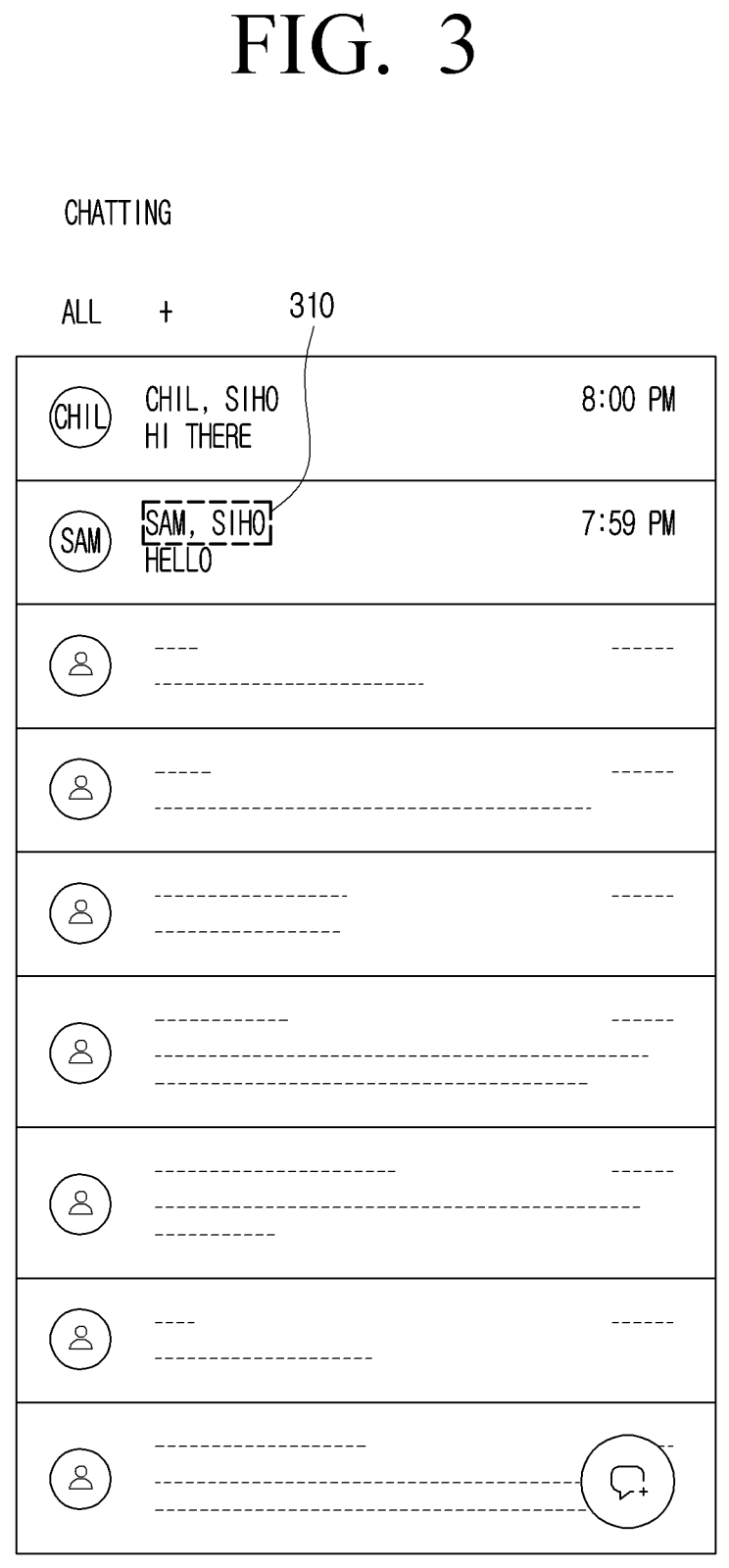
Figure 4:
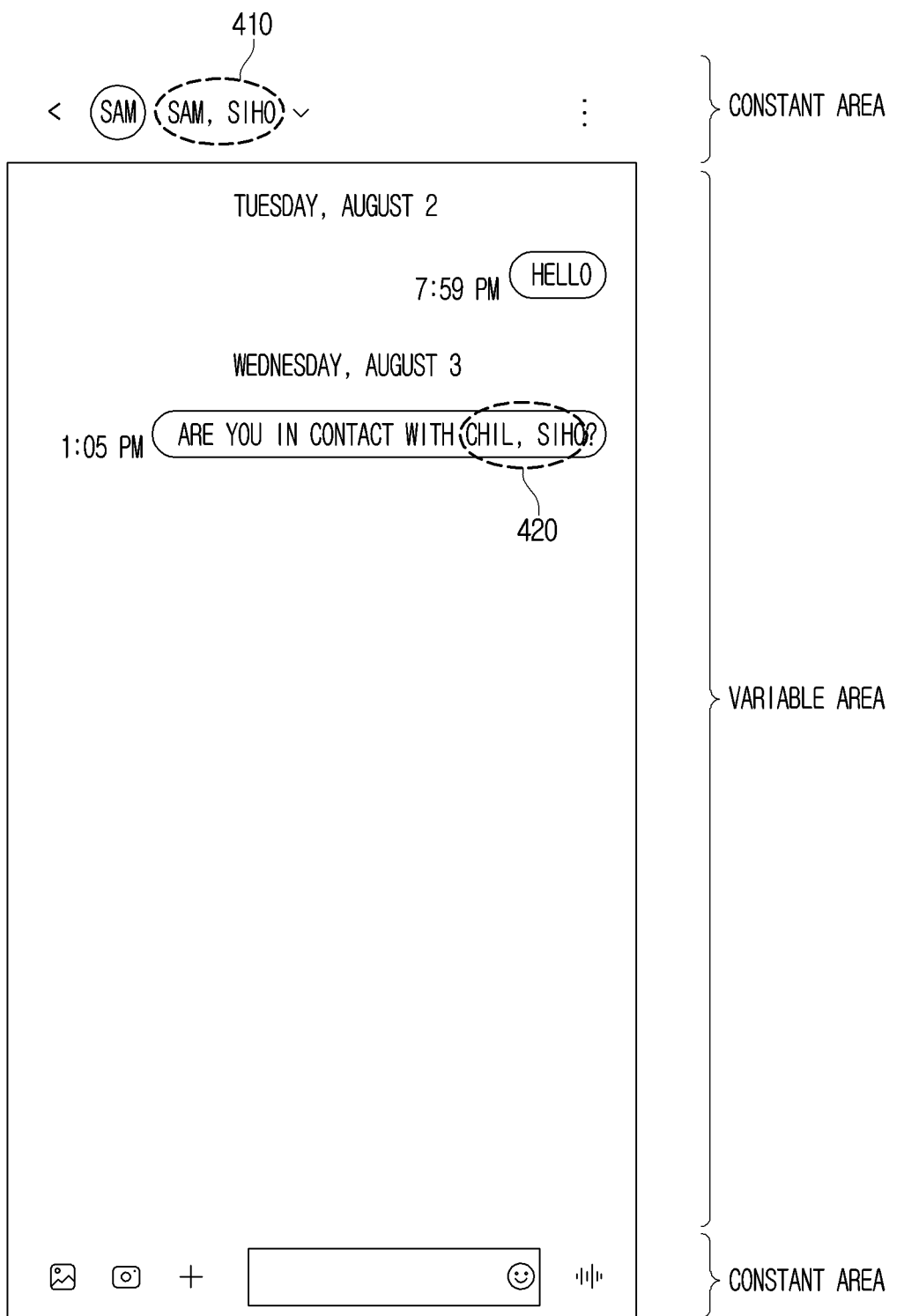
Figure 5:
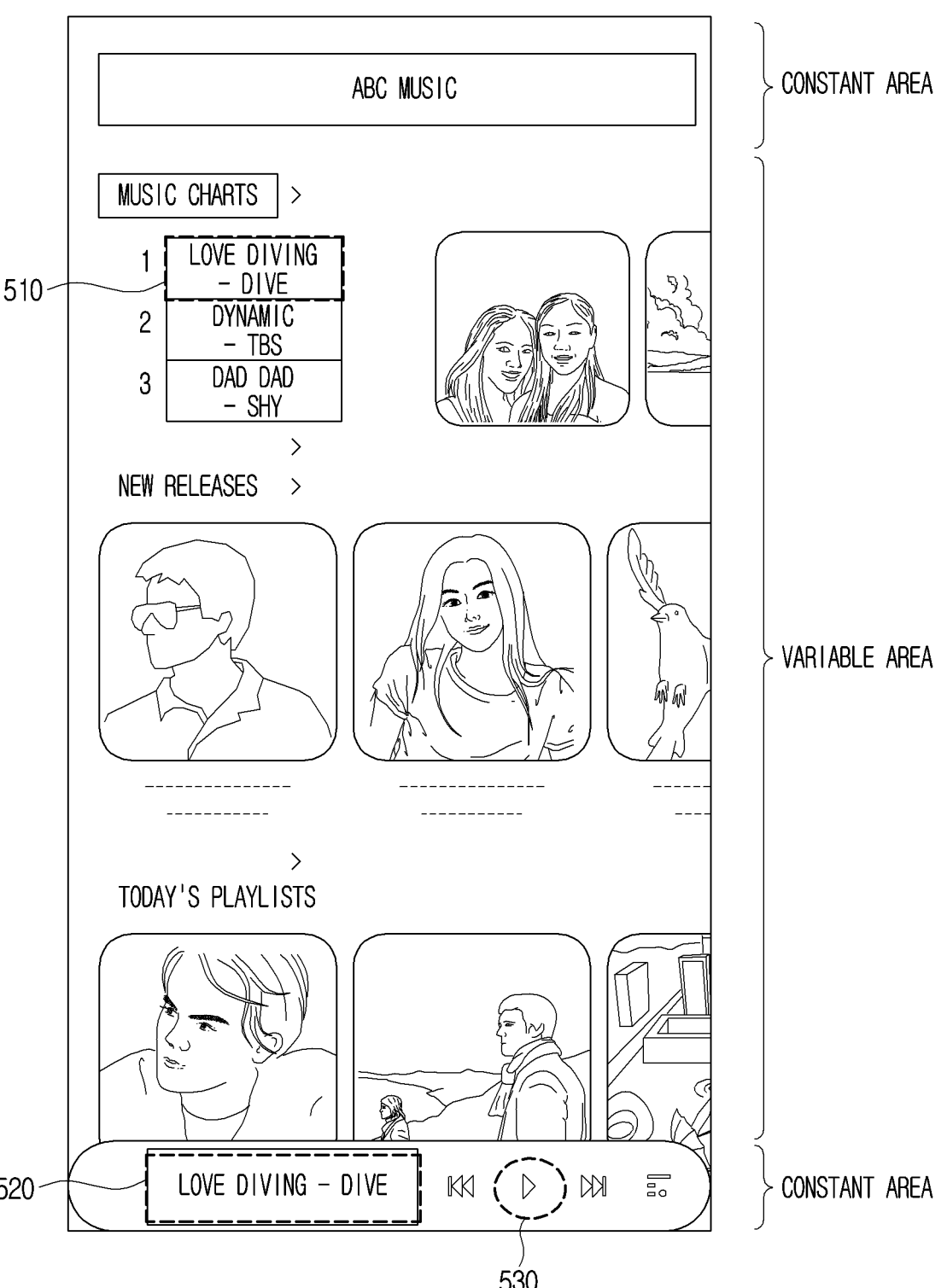

FIGS. 3, 4, and 5 are diagrams illustrating a process of identifying a target object from a UI screen based on a comparison result between first information and second information according to various embodiments of the disclosure.

Referring to FIG. 3, the first UI screen according to one or more embodiments of the disclosure may be a UI screen provided by a chat application, and may be a UI screen showing information on a plurality of chat rooms.

As described above, if the user voice is received while the first UI screen is being displayed on the display 120, the processor 140 may obtain text information corresponding to the user voice by inputting the received users voice in the voice recognition module 210. Further, the processor 140 may obtain, based on the text information, first information including information on the command and information on the execution target of the command included in the text information.

In the example of FIG. 3, the text information corresponding to the user voice may be "send a message asking SAM, SIHO to call." When text information as described above is obtained, the processor 140 may obtain first information showing that the command corresponding to the text "send a message" is "Send Message," and the execution target (i.e., a receiver the message) of the command "Send Message" is a person known as "SAM, SIHO."

The processor 140 may obtain, based on the metadata on the first UI screen, second information including information on the functions corresponding to the plurality of objects and information on the texts included in the plurality of objects.

In the example of FIG. 3, the processor 140 may obtain the second information including information on an object (icon) showing a function of "add chatroom," information on texts, such as "CHIL, SIHO," "Hi, there," "Hello," and "SAM, SIHO" 310, and the like.

The processor 140 may identify, based on the comparison result between the first information and the second information, whether the target object corresponding to the user voice is present from among the plurality of objects.

Specifically, a process of identifying the target object based on the comparison result between the first information and the second information may be performed according to the various embodiments which will be described below.

According to one or more embodiments of the disclosure, the target object may be identified based on the information on the command and the information on the execution target of the command included in the first information are a match to information on the function and information of the text included in the second information.

In the example of FIG. 3, the first information may include information showing that the execution target of the command is a person known as "SAM, SIHO," and the second information may include the text "SAM, SIHO." For example, because "SAM, SIHO" of the first information matches with "SAM, SIHO" of the second information, the processor 140 may identify the object corresponding to "SAM, SIHO" 310 included in the first UI screen as the target object.

According to one or more embodiments of the disclosure, the target object may be identified based on whether the information on the command and the information on the execution target of the command included in the first information are included in the information on the function and the information on the text included in the second information.

In the example of FIG. 3, because "SAM, SIHO" of the first information is included in "SAM, SIHO" of the second information, the processor 140 may identify as the target object corresponding to "SAM, SIHO" 310 included in the first UI screen.

Meanwhile, unlike the example of FIG. 3, even when the second information includes "brother SAM, SIHO," because "SAM, SIHO" of the first information is included in "brother SAM, SIHO" of the second information, the processor 140 may identify an object corresponding to "brother SAM, SIHO" included in the first UI screen as the target object.

Referring to FIG. 4, the first UI screen according to one or more embodiments of the disclosure may be a UI screen provided by the chat application, and may be a UI screen showing information on a specific chatroom.

In the example of FIG. 4, the processor 140 may obtain second information including information on texts, such as "SAM, SIHO" 410 and "are you in contact with CHIL, SIHO?" 420 as information on functions corresponding to the plurality of objects.

In the example of FIG. 4, if the text information corresponding to the user voice is "send a message asking SAM, SIHO to call," the processor 140 may obtain first information showing that the execution target of the command is a person known as "SAM, SIHO," and because the above is a case in which "SAM, SIHO" of the first information matches with "SAM, SIHO" of the second information, the processor 140 may identify "SAM, SIHO" 410 included in the first UI screen as the target object. In this case, because the first UI screen is a UI screen showing a chatroom of the person "SAM, SIHO," the processor 140 may input a message indicating "Call Me" in a text input field included in the first UI screen without conversion of the UI screen, and perform a function corresponding to a message transmit button.

Meanwhile, according to an embodiment of FIG. 4, if the text information corresponding to the user voice is "send a message asking CHIL, SIHO to call," the processor 140 may obtain the first information showing that the execution target of the command is a person known as "CHIL, SIHO," and because the above is a case in which "CHIL, SIHO" of the first information matches with "CHIL, SIHO" of the second information, the processor 140 may identify "CHIL, SIHO" 420 included in the first UI screen as the target object. In this case, based on the target object being present in the first UI screen despite the first UI screen being a UI screen showing a chatroom of the person known as "SAM, SIHO," if a message of "Call Me" is input to the text input field included in the first UI screen without the conversion of the UI screen and the function corresponding to the message transmit button is performed, an operation which does not match an utterance intent of the user may be performed. Accordingly, the processor 140 may identify the target object by determining the information subject to comparison from among the first information and the second information.

Specifically, the processor 140 may identify the variable area in which information displayed within the first UI screen is changed and the constant area which is different from the variable area based on the metadata on the first UI screen, and obtain the second information from the at least one object included in the constant area. For example, the processor 140 may obtain the second information based only on the at least one object included in the constant area without considering the object included in the variable area of the first UI screen.

For example, the processor 140 may not only divide the variable area and the constant area based on metadata on the first UI screen, but also divide the variable area and the constant area using a pre-defined algorithm or a neural network model trained to divide the variable area and the constant area included in the UI screen.

Referring to FIG. 4, the text "SAM, SIHO" 410 may be included in the constant area, and the text "CHIL, SIHO" 420 may be included in the variable area. Accordingly, the processor 140 may obtain, in obtaining the second information based on the metadata on the first UI screen, second information without considering the text "CHIL, SIHO" 420 included in the variable area, and considering the text "SAM, SIHO" 410 included in the constant area.

Accordingly, if the text information corresponding to the user voice is "send a message asking CHIL, SIHO to call," because the "CHIL, SIHO" of the first information does not match with "SAM, SIHO" of the second information and "CHIL, SIHO" of the first information is not included in the "SAM, SIHO" of the second information, the processor 140 may identify as the target object corresponding to the user voice not being present from among the plurality of objects included in the first UI screen. In this case, the processor 140 may perform an operation matching the utterance intent of the user by controlling the display 120 to display the third UI screen showing a chatroom of the person known as "CHIL, SIHO," inputting a message of "Call Me" in the text input field included in the third UI screen, and performing the function corresponding to the message transmit button.

Referring to FIG. 5, the first UI screen according to one or more embodiments of the disclosure may be a UI screen provided by a music application, and may include information on a plurality of music content, information on a music content currently selected, and the like.

In the example of FIG. 5, the text information corresponding to the user voice may be "turn on LOVE DIVING." When text information as described is obtained, the processor 140 may obtain first information including information showing that the command corresponding to the text "turn on" is "PLAY" and the execution target of the command "PLAY" is "LOVE DIVING."

Meanwhile, in the example of FIG. 5, the processor 140 may obtain second information including information on a text 510 "LOVE DIVING" in the variable area showing information on a plurality of music content, information on a text 520 "LOVE DIVING" in the constant area showing information on a currently selected music content, information on an object 530 showing a function "PLAY THE SELECTED SONG," and the like.

A process of identifying the target object may be performed by taking into consideration, both, whether the information on the command and information on the execution target of the command included in the first information are a match to the information on the function and the information on the text included in the second information, and whether the information on the command and the information on the execution target of the command included in the first information are included in the information on the function and the information on the text included in the second information.

Specifically, the processor 140 may identify the target object based on whether the information on the execution target of the command included in the first information is a match with the information on the text included in the second information, and the information on the command included in the first information is included in the information on the function included in the second information.

Referring to FIG. 5, because "LOVE DIVING" which is the execution target of the command included in the first information is a match with "LOVE DIVING" which is the text included in the second information, and the command "PLAY" included in the first information is included in "PLAY THE SELECTED SONG" which is the text showing the function of the object included in the second information, the processor 140 may identify an object 530 showing the function of "PLAY THE SELECTED SONG" from among the plurality of objects included in the first UI screen as the target object. In this case, the processor 140 may playback, by executing the function "PLAY THE SELECTED SONG," a music content known as "LOVE DIVING," and control the display 120 to display the second UI screen showing that the music content known as "LOVE DIVING" is being played back.

Meanwhile, unlike the example of FIG. 5, if "LOVE DIVING" which is the execution target of the command included in the first information is a match with "LOVE DIVING" which is the text included in the second information, and the command "PLAY" included in the first information is not included in the text showing the function of the object included in the second information, the processor 140 may identify that the target object is not present in the first UI screen, and control the display 120 to display the third UI screen for playing back the music content known as "LOVE DIVING."

In the disclosure, the second UI screen may refer to a UI screen for performing an operation corresponding to a command when the target object corresponding to the user voice is present in the first UI screen, and the third UI screen may refer to a UI screen for performing an operation corresponding to a command when the target object corresponding to the user voice is not present in the first UI screen.

Meanwhile, unlike the example of FIG. 5, although "LOVE DIVING" which is the execution target of the command included in the first information is a match with "LOVE DIVING" which is the text included in the second information, if the music content known as "LOVE DIVING" is already being played back in an instance, such as an object showing a function known as "PAUSE THE SELECTED SONG" is included in the first UI screen rather than the object showing the function "PLAY THE SELECTED SONG," the processor 140 may maintain the displaying of the first UI screen.

Meanwhile, unlike the example of FIG. 5, if "LOVE DIVING" which is the execution target of the command included in the first information is not a match with "LOVE DIVING" which is the text included in the second information, the processor 140 may identify as the target object not being present in the first UI screen without considering whether the command "PLAY" included in the first information is included in the second information, and the processor 140 may control the display 120 to display the third UI screen to search for the music content known as "LOVE DIVING" or the third UI screen to determine the music content which is subject to playback.

Figure 6:
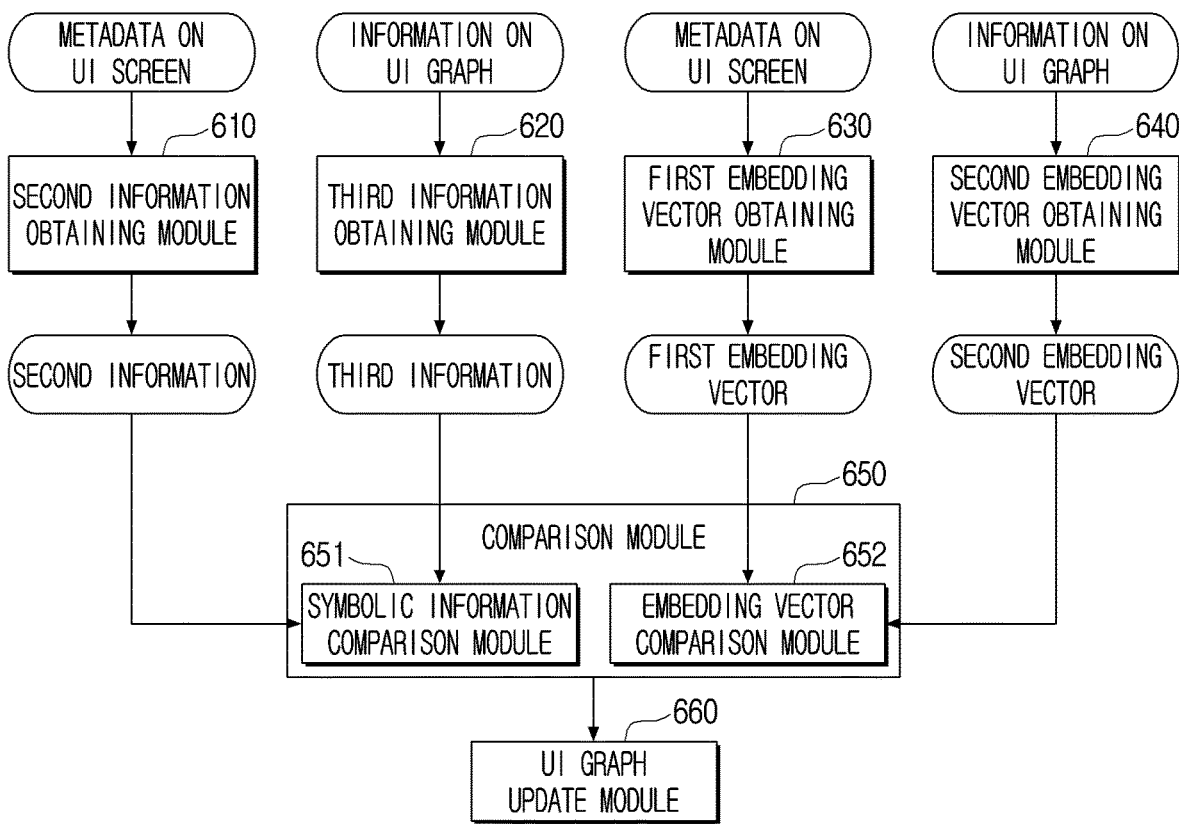
FIG. 6 is a block diagram illustrating a plurality of modules used in a process of generating a UI graph according to an embodiment of the disclosure.

FIG. 6 is a block diagram illustrating a plurality of modules used in a process of generating a UI graph according to an embodiment of the disclosure.

Figure 7:
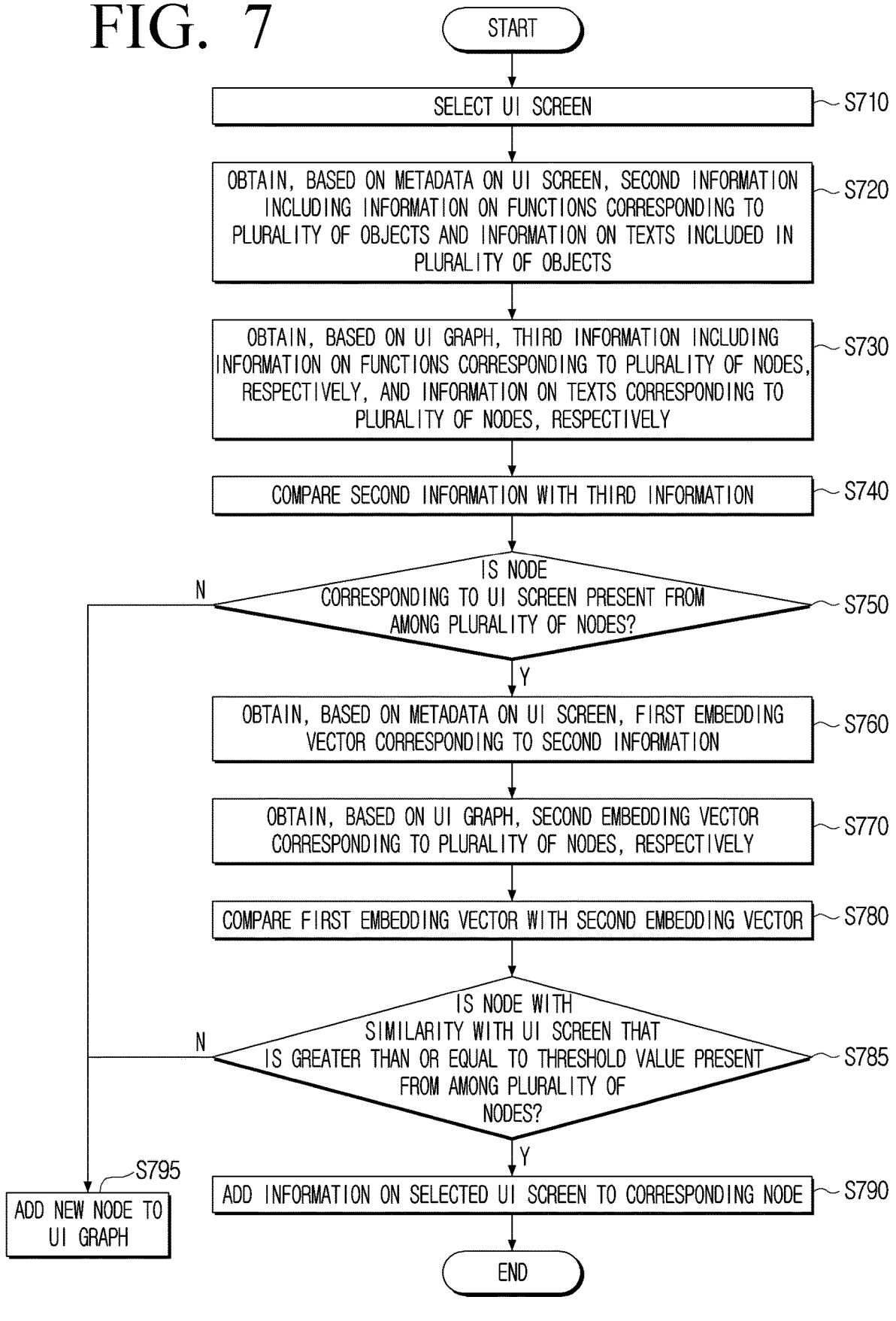
FIG. 7 is a flowchart for illustrating a process of generating a UI graph according to an embodiment of the disclosure.

FIG. 7 is a flowchart for illustrating a process of generating a UI graph according to an embodiment of the disclosure.

Referring to FIG. 6, the plurality of modules according to an embodiment of the disclosure may include a second information obtaining module 610, a third information obtaining module 620, a first embedding vector obtaining module 630, a second embedding vector obtaining module 640, a comparison module 650, and a UI graph update module 660, and the comparison module 650 may specifically include a symbolic information comparison module 651 and an embedding vector comparison module 652. A process of generating a UI graph according to the disclosure will be described below with reference to FIGS. 6 and 7.

Referring to FIG. 7, when the UI screen is selected at operation S710, the processor 140 may obtain, based on the metadata on the UI screen, second information including information on the functions corresponding to the plurality of objects and information on the texts included in the plurality of objects at operation S720. Specifically, when the metadata on the selected UI screen is input, the second information obtaining module 610 may obtain second information which is the symbolic information included in the UI screen, and transmit the second information to the symbolic information comparison module 651. The second information may include information on the functions corresponding to the plurality of objects and information on the texts included in the plurality of objects included in the UI screen as described above.

The processor 140 may obtain, based on the UI graph, third information including information on functions corresponding to the plurality of nodes, respectively, and information on the texts corresponding to the plurality of nodes, respectively at operation S730. Specifically, when the information on the UI graph is input, the third information obtaining module 620 may obtain third information which is the symbolic information included in the UI graph, and transmit the third information to the symbolic information comparison module 651. Here, the third information refers to information on the UI screens corresponding to the respective nodes included in the UI graph, and specifically, may include information on functions corresponding to the plurality of objects and information on texts included in the plurality of objects included in the UI screens.

The processor 140 may compare the second information with the third information at operation S740, and identify whether a node corresponding to the UI screen is present from among the plurality of nodes at operation S750. Specifically, when the second information is received from the second information obtaining module 610 and the third information is received from the third information obtaining module 620, the symbolic information comparison module 651 may identify whether the node corresponding to the UI screen is present from among the plurality of nodes based on at least one from among whether the second information and the third information are a match, whether the second information and the third information are similar, and whether the second information is included in the third information.

If the node corresponding to the UI screen is identified as present from among the plurality of nodes at operation S750-Y, the processor 140 may obtain, based on the metadata on the UI screen, the first embedding vector corresponding to the second information at operation S760. Specifically, when the metadata on the UI screen is input, the first embedding vector obtaining module 630 may obtain the first embedding vector showing attributes of the plurality of objects included in the UI screen by encoding the metadata on the UI screen, and transmit the first embedding vector to the embedding vector comparison module 652.

The processor 140 may obtain, based on the UI graph, the second embedding vector corresponding to the plurality of nodes, respectively at operation S770. Specifically, when information on the UI graph is input, the first embedding vector obtaining module 630 may obtain the second embedding vector showing attributes of the plurality of nodes included in the UI graph by encoding the information on the UI graph, and transmit the second embedding vector to the embedding vector comparison module 652.

The processor 140 may compare the first embedding vector with the second embedding vector at operation S780, and identify whether the node with a similarity with the UI screen that is greater than or equal to a threshold value is present from among the plurality of nodes at operation S785. Specifically, when the first embedding vector is received from the first embedding vector obtaining module 630 and the second embedding vector is received from the second embedding vector obtaining module 640, the embedding vector comparison module 652 may calculate the similarity between the first embedding vector and the second embedding vector, and identify whether a node with the calculated similarity being greater than or equal to the threshold value is present.

For example, the similarity between the first embedding vector and the second embedding vector may be calculated based on various methods, such as cosine similarity or Euclidean distance.

If the node with the similarity with the UI screen being greater than or equal to the threshold value is identified as present from among the plurality of nodes at operation S785-Y, the processor 140 may add information on the selected UI screen to the corresponding node at operation S790. For example, when a first node corresponding to the first UI screen is identified as present from among the plurality of nodes based on comparing symbolic information of the second information and the third information, and the similarity between the first node and the first UI screen being identified as greater than or equal to the threshold value based on comparing the first embedding vector with the second embedding vector, the UI graph update module 660 may add information on the first UI screen as information on the first node. Accordingly, the processor 140 may identify, based on controlling the displaying of the UI screen thereafter based on the user voice, as the first UI screen corresponding to the first node.

If the node corresponding to the UI screen is identified as not being present from among the plurality of nodes at operation S750-N, or if the node with similarity with the UI screen being greater than or equal to the threshold value is identified as not being present from among the plurality of nodes at operation S785-N, the processor 140 may add a new node to the UI graph at operation S795. For example, if the node corresponding to the first UI screen is identified as not being present in the plurality of nodes, the UI graph update module 660 may update the UI graph such that the first node corresponding to the first UI screen is included to the UI graph. Accordingly, the processor 140 may identify, based on controlling the displaying of the UI screen thereafter based on the user voice, the first UI screen as corresponding to the first node.

Meanwhile, in the descriptions of FIGS. 6 and 7, an embodiment of first comparing the second information and the third information, which are symbolic information, and comparing the first embedding vector with second embedding vector limited to when the node corresponding to the UI screen is identified as being present from among the plurality of nodes based on comparing the second information and the third information has been described, but the disclosure is not limited thereto.

For example, the electronic device 100 may first compare the first embedding vector and the second embedding vector, and may also compare the second information with the third information limited to when the node with similarity with the UI screen being greater than or equal to the threshold value is identified as being present from among the plurality of nodes based on comparing the first embedding vector and the second embedding vector. In addition to the above, the electronic device 100 may quantify a comparison result of the second information and the third information, and identify the node corresponding to the UI screen from among the plurality of nodes by combining the quantified comparison result with a value representing the similarity between the first embedding vector and the second embedding vector.

In the above, according to an embodiment described above with reference to FIGS. 6 and 7, the electronic device 100 according to the disclosure may build, while selecting various UI screens, a UI graph based on whether similarity of an embedding vector corresponding to each of the UI screens as described above and the symbolic information shown by plurality of objects included in each of the UI screens correspond, and accordingly, may effectively perform a control of the UI screen based on the user voice thereafter.

Specifically, according to the disclosure, because a node can be generated taking into consideration not only the similarity of the embedding vector corresponding to each of the UI screens, but also whether symbolic information, such as text information corresponds, and accordingly, the UI graph may be more effectively be built by dividing the nodes of the UI graph based on not only the similarity of the UI screen but also the functions of the objects included in the UI screen.

Figure 8:
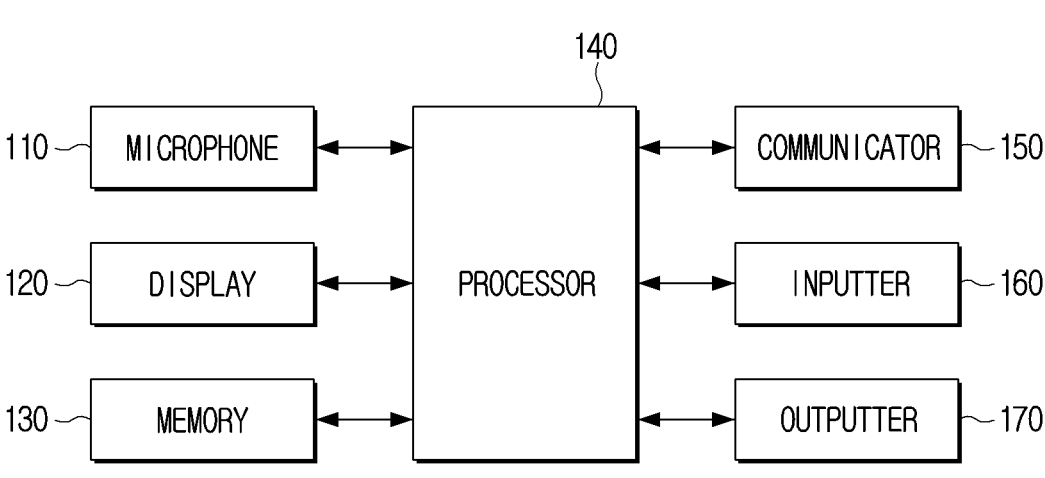
FIG. 8 is a flowchart illustrating a configuration of an electronic device according to an embodiment of the disclosure.

FIG. 8 is a flowchart illustrating a configuration of an electronic device according to an embodiment of the disclosure.

Referring to FIG. 8, the electronic device 100 according to an embodiment of the disclosure may include not only the microphone 110, the display 120, the memory 130, and the processor 140, but also further include a communicator 150, an inputter 160, and an outputter 170. However, the configurations as shown in FIGS. 1 and 8 are merely examples, and new configurations may be added or some configurations may be omitted in addition to the configurations shown in FIGS. 1 and 8 in implementing the disclosure.

The communicator 150 may include circuitry, and perform communication with an external device. Specifically, the processor 140 may receive various data or information from the external device connected through the communicator 150, and transmit various data or information to the external device.

The communicator 150 may include at least one from among a wireless fidelity (wi-fi) module, a Bluetooth module, a wireless communication module, an NFC module, and an ultra wide band (UWB) module. Specifically, the wi-fi module and the Bluetooth module may perform communication in a wi-fi method and a Bluetooth method, respectively. When using the wi-fi module or the Bluetooth module, various connection information, such as a service set identifier (SSID) is first transmitted and received, and various information may be transmitted and received after communicatively connecting by using the various connection information.

In addition, the wireless communication module may perform communication according to various communication standards, such as, for example, and without limitation, institute of electrical and electronics engineers (IEEE), Zig-Bee, $3^{rd}$ generation (3G), $3^{rd}$ generation partnership project (3GPP), long term evolution (LTE), $5^{th}$ generation (5G), and the like. Further, the NFC module may perform communication in a near field communication (NFC) method using a 13.56 megahertz (MHz) band from among the various radio-frequency identification (RFID) frequency bands, such as, for example, and without limitation, 135 kilohertz (kHz), 13.56 MHz, 433 MHz, 860-960 MHz, 2.45 gigahertz (GHz), or the like. In addition, the UWB module may accurately measure, through communication between UWB antennas, a time of arrival (ToA) which is time at which a pulse reaches a target object, and an angle of arrival (AoA) which is an angle at which a pulse arrives at from a transmission device. Thereby, an accurate distance and position recognition may be possible within an error range of within tens of centimeters (cm) indoors.

Specifically, according to the various embodiments of the disclosure, the processor 140 may receive information on the UI graph, information on an application, metadata on the UI screen, and the like from an external device through the communicator 150. In addition, the processor 140 may control the communicator 150 to transmit information on the user voice to a server including a voice recognition model, and receive text information corresponding to the user voice from the external device through the communicator 150.

The inputter (or input interface) 160 may include circuitry, and the processor 140 may receive a user command for controlling an operation of the electronic device 100 through the inputter 160. Specifically, the inputter 160 may be implemented in a form, such as a camera (not shown) and a remote controller signal receiver (not shown). Further, the inputter 160 may be implemented as a touch screen in a form included in the display 120.

Specifically, according to the various embodiments of the disclosure, the processor 140 may receive a user input for activating the microphone 110 through the inputter 160. In addition, the processor 140 may receive a user input for selecting the UI screen through the inputter 160, and receive a user input for generating the UI graph corresponding to the selected UI screen.

The outputter (or output interface) 170 may include circuitry, and the processor 140 may output various functions that can be performed by the electronic device 100 through the outputter 170. Further, the outputter 170 may include at least one from among a speaker and an indicator. The speaker may output audio data by the control of the processor 140, and the indicator may be lit-up by the control of the processor 140.

Specifically, according to the various embodiments of the disclosure, the processor 140 may output a message for guiding that an operation corresponding to the user voice has been performed through the outputter 170. In addition, the processor 140 may output a message for guiding what the identified target object is from among the plurality of objects through the outputter 170.

In the above, the microphone 110 has been described as a separate configuration from the inputter 160 and the display 120 has been described as a separate configuration from the outputter 170, but the microphone 110 and the display 120 may be one configuration of the inputter 160 and the outputter 170, respectively.

Figure 9:
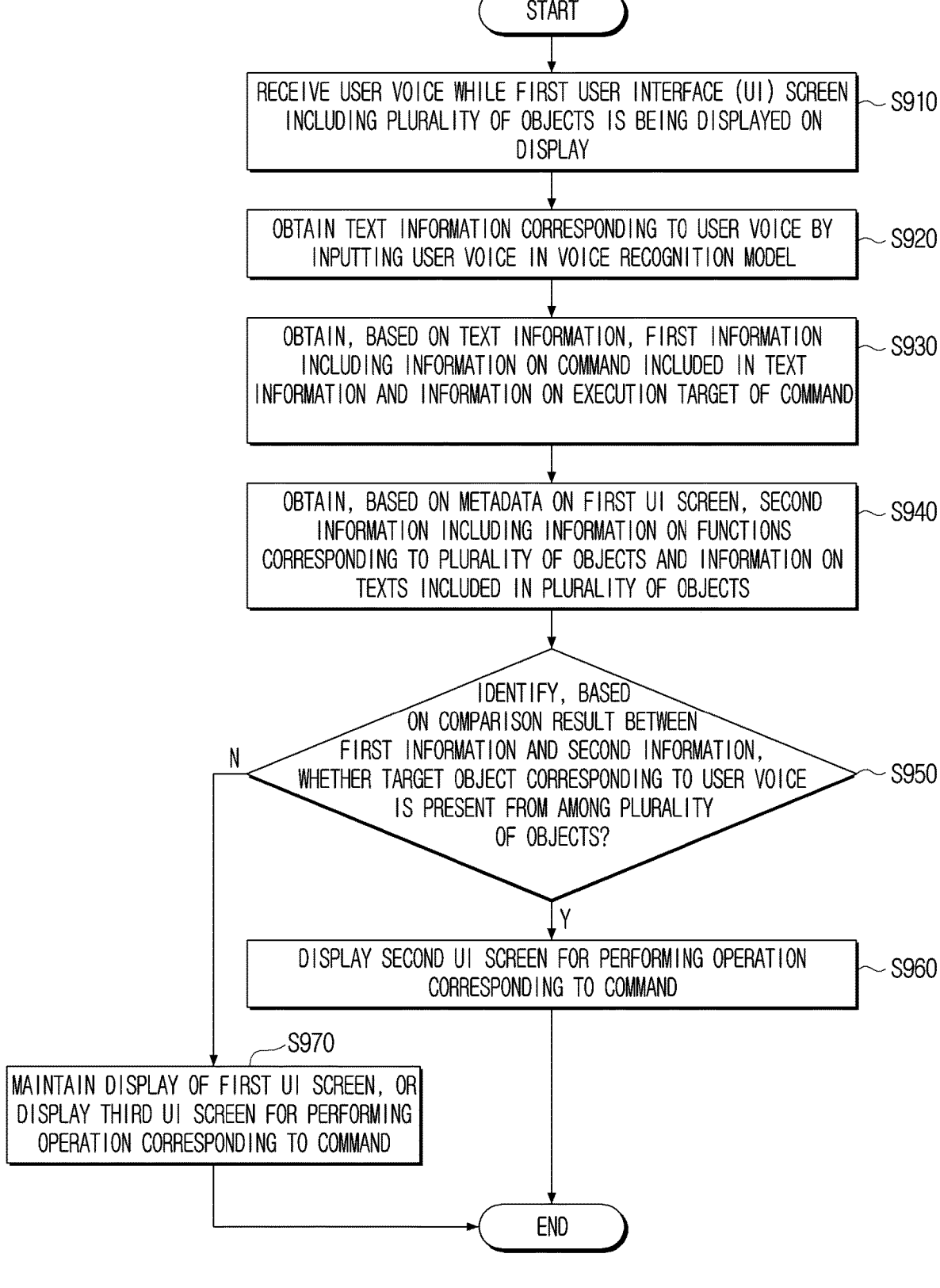
FIG. 9 a flowchart illustrating a method of controlling an electronic device according to an embodiment of the disclosure.

FIG. 9 a flowchart illustrating a method of controlling an electronic device according to an embodiment of the disclosure.

Referring to FIG. 9, the electronic device 100 may receive the user voice while the first user interface (UI) screen including the plurality of objects is being displayed on the display 120 at operation S910. Then, the electronic device 100 may obtain text information corresponding to the user voice by inputting the user voice in the voice recognition model at operation S920. Here, the voice recognition model may not only be stored in the electronic device 100, but also stored in an external server.

The electronic device 100 may obtain, based on the text information, first information including information on the command included in the text information and information on the execution target of the command at operation S930. Specifically, 'first information' may refer to symbolic information included in the text information corresponding to the user voice, and specifically, include information on the command and information on the execution target of the command.

The electronic device 100 may obtain, based on the metadata on the first UI screen, second information including information on the functions corresponding to the plurality of objects and information on texts included in the plurality of objects at operation S940. For example, if the first object includes a text from among the plurality of objects, the second information obtaining module 230 may identify the text included in the first object. In addition, if the second object includes an icon from among the plurality of objects, the second information obtaining module 230 may identify the text showing the function of the icon. Further, the electronic device 100 may obtain the second information including the text included in the first object and the text corresponding to the icon of the second object.

The electronic device 100 may identify, based on the comparison result between the first information and the second information, whether the target object corresponding to the user voice is present from among the plurality of objects at operation S950.

Specifically, the target object identifying module may identify the target object based on whether the information on the command and the information on the execution target of the command included in the first information are a 'match' to the information on the function and the information on the text included in the second information. The target object identifying module may identify the target object based on whether the information on the command and the information on the execution target of the command included in the first information is 'included' in the information on the function and the information on the text included in the second information. Furthermore, the target object identifying module may identify the target object based on whether the information on the command and the information on the execution target of the command included in the first information is 'similar' with the information on the function and the information on the text included in the second information. Here, whether it is similar may be identified using the pre-defined rule or the trained neural network model.

In addition, the electronic device 100 may identify the target object based on a combination of whether it is a match, whether it is included, and whether it is similar as described above, and in addition to the above, various rules for identifying the target object may be applied.

When the target object from among the plurality of objects is identified at operation S950-Y, the electronic device 100 may display the second UI screen for performing an operation corresponding to the command at operation S960.

Specifically, when the target object is identified, the electronic device 100 may obtain the first embedding vector corresponding to the second information based on the metadata on the first UI screen. The electronic device 100 may obtain the second embedding vector showing attributes of the plurality of nodes included in the UI graph. The electronic device 100 may identify the first node corresponding to the first UI screen from among the plurality of nodes based on the comparison result between the first information and the second information and the comparison result between the first embedding vector and the second embedding vector. Then, the electronic device 100 may identify, based on the information of the command and the information on the execution target of the command, the second node for performing an operation corresponding to the command from among the at least one node connected to the first node, and control the display 120 to display the second UI screen corresponding to the second node.

If the target object is not identified from among the plurality of objects at operation S950-N, the electronic device 100 may maintain the displaying of the first UI screen, or display the third UI screen for performing an operation corresponding to the command at operation S970.

Meanwhile, a method of controlling the electronic device 100 according to the above-described embodiments may be implemented as a program and provided in the electronic device 100. Specifically, a program including the method of controlling the electronic device 100 may be stored and provided in a non-transitory computer readable medium.

Specifically, in terms of a non-transitory computer-readable storage medium including a program which executes the method of controlling the electronic device 100, the method of controlling the electronic device 100 includes obtaining, based on the user voice being received while the first user interface (UI) screen including the plurality of objects is displayed on the display 120 of the electronic device 100, text information corresponding to the user voice by inputting the user voice in the voice recognition model, obtaining, based on the text information, first information including information on the command and information on the execution target of the command included in the text information, obtaining, based on the metadata on the first UI screen, second information including information on functions corresponding to the plurality of objects and information on texts included in the plurality of objects, identifying, based on the comparison result between the first information and the second information, whether the target object corresponding to the user voice is present from among the plurality of objects, and controlling, based on the target object being identified, the display 120 to display the second UI screen corresponding to the target object for performing an operation corresponding to the command.

In the above, the method of controlling the electronic device 100, and a computer-readable recording medium including the program which executes the method of controlling the electronic device 100 has been briefly described, but this is merely to omit redundant descriptions, and the various embodiments of the electronic device 100 may be applied to the method of controlling the electronic device 100, and even to the computer-readable storage medium including the program which executes the method of controlling the electronic device 100.

According to the various embodiments of the disclosure as described above, the electronic device 100 may clearly identify, by comparing the first information obtained from the user voice with the second information obtained from the UI screen which is currently being displayed, the target object corresponding to the user voice from the UI screen which is currently being displayed, and perform voice control matching the user intent.

Specifically, according to the disclosure, for even an application in which the application programming interface (API) on voice control is not provided, the embedding vector and symbolic information may be obtained based on the metadata on the application, and voice control on the UI screen that is currently being displayed may be possible by comparing the above with the embedding vector and the symbolic information corresponding to the user voice.

Functions associated with artificial intelligence according to the disclosure may be operated through the processor 140 and the memory 130 of the electronic device 100. The processor 140 may be formed of one or a plurality of processors 140. At this time, the one or the plurality of processors 140 may include at least one from among a central processing unit (CPU), a graphics processing unit (GPU), and a neural processing unit (NPU), but is not limited to the examples of the above-described processor 140.

The CPU may effectively execute, as a generic-purpose processor 140 capable of performing not only typical computations but also artificial intelligence computations, a complex program through a multi-tiered cache structure. The CPU may be advantageous in a series computing method which makes an organic connection of a previous calculation result and a following calculation result possible through a sequential calculation. The generic-purpose processor 140 is not limited to the above-described example except for when specified to the above-described CPU.

The GPU may be a processor 140 for mass computations, such as floating point computations and the like used in graphic processing, and may perform a mass-scale computation in parallel by integrating the core in mass amounts. Specifically, the GPU may be advantageous in a parallel computation method, such as a convolution computation compared to the CPU. IN addition, the GPU may be used as a co-processor 140 for supplementing the function of the CPU. The processor 140 for mass computation is not limited to the above-described examples except for when specified as the above-described GPU.

The NPU may be a processor 140 specializing in artificial intelligence computations which use an artificial neural network, and may be implemented as hardware (e.g., silicon) for each layer that form the artificial neural network. At this time, because the NPU is designed specialized according to the required specifications of a company, it has a lesser degree of freedom compared to the CPU or the GPU, but it may effectively process the artificial intelligence computations demanded by the company. Meanwhile, as a processor 140 specializing in artificial intelligence computations, the NPU may be implemented in various forms, such as, for example, and without limitations, a tensor processing unit (TPU), an intelligence processing unit (IPU), a vision processing unit (VPU), and the like. The artificial intelligence processor 140 is not limited to the above-described examples except for when specified as the above-described NPU.

In addition, the one or the plurality of processors 140 may be implemented as a system on chip (SoC). At this time, in the SoC, the memory 130, and a network interface, such as a Bus for data communication between the processor 140 and the memory 130 may be further included in addition to the one or the plurality of processors 140.

When the plurality of processors 140 are included in the SoC included in the electronic device 100, the electronic device 100 may perform a computation (e.g., learning of the artificial intelligence model or computation associated with inference) associated with the artificial intelligence by using a portion of the processors 140 from among the plurality of processors 140. For example, the electronic device 100 may perform a computation associated with the artificial intelligence by using at least one from among the GPU, the NPU, the VPU, the TPU, and a hardware accelerator specializing in artificial intelligence computation, such as the convolution computation and a matrix multiplication computation from among the plurality of processors 140. However, the above is merely one embodiment of the disclosure, and computations associated with artificial intelligence may be processed using the generic-purpose processor 140, such as the CPU.

In addition, the electronic device 100 may perform a computation on a function associated with artificial intelligence by using a multi-core (e.g., a dual core, a quad core, or the like) included in the one processor 140. Specifically, the electronic device 100 may perform the artificial intelligence computation, such as the convolution computation and the matrix multiplication computation in parallel using the multi-core included in the processor 140.

The one or the plurality of processors 140 may control to process input data according to a pre-defined operation rule or an artificial intelligence model stored in the memory 130. The pre-defined operation rule or the artificial intelligence model may be characterized by being created through learning.

The being created through learning may refer to the pre-defined operation rule or the artificial intelligence model of a desired characteristic being formed by applying a learning algorithm to a plurality of learning data. The learning may be carried out in a device itself in which the artificial intelligence according to the disclosure is performed, or carried out through a separate server/system.

The artificial intelligence model may be formed of a plurality of neural network layers. The at least one layer may have at least one weight value, and perform computation of the layers through the computation result of a previous layer and at least one defined computation. Examples of the neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep-Q networks, and a transformer, and the neural network of the disclosure is not limited to the above-described examples, except for when otherwise specified.

The learning algorithm may be a method for training a predetermined target machine (e.g., robot) to make decisions or predictions on its own using the plurality of learning data. Examples of the learning algorithm may include a supervised learning, an unsupervised learning, a semi-supervised learning, or a reinforcement learning, and the learning algorithm of the disclosure is not limited to the above-described examples except for when the learning algorithm is specified in the disclosure.

A machine-readable storage medium may be provided in a form of a non-transitory storage medium. Herein, 'non-transitory storage medium' merely means that it is a tangible device and does not include a signal (e.g., electromagnetic waves), and the term does not differentiate data being semi-permanently stored or being temporarily stored in the storage medium. For example, the 'non-transitory storage medium' may include a buffer in which data is temporarily stored.

According to one or more embodiments of the disclosure, a method according to the various embodiments described in the disclosure may be provided included a computer program product. The computer program product may be exchanged between a seller and a purchaser as a commodity. The computer program product may be distributed in the form of a machine-readable storage medium (e.g., a compact disc read only memory (CD-ROM)), or distributed (e.g., downloaded or uploaded) online through an application store (e.g., PLAYSTORE™) or directly between two user devices (e.g., smartphones). In the case of online distribution, at least a portion of the computer program product (e.g., downloadable app) may be stored at least temporarily in the storage medium readable by a device, such as a server of a manufacturer, a server of an application store, or memory 130 of a relay server, or temporarily generated.

Each of the elements (e.g., a module or a program) according to various embodiments of the disclosure as described in the above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration.

Operations performed by a module, a program, or another element, in accordance with various embodiments of the disclosure, may be executed sequentially, in a parallel, repetitively, or in a heuristic manner, or at least some operations may be executed in a different order, omitted or a different operation may be added.

Meanwhile, the term "part" or "module" used in the disclosure may include a unit formed of a hardware, software, or firmware, and may be used interchangeably with terms, such as, for example, and without limitation, logic, logic blocks, components, circuits, or the like. "Part" or "module" may be a component integrally formed or a minimum unit or a part of the component performing one or more functions. For example, a module may be formed as an application-specific integrated circuit (ASIC).

The various embodiments of the disclosure may be implemented with software including instructions stored in a machine-readable storage media (e.g., computer). The machine may call an instruction stored in the storage medium, and as a device operable according to the called instruction, may include an electronic device (e.g., the electronic device 100) according to the above-mentioned embodiments.

Based on the instruction being executed by the processor, the processor may directly or using other elements under the control of the processor perform a function corresponding to the instruction. The instruction may include a code generated by a compiler or executed by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a microphone;
a display;
memory storing instructions; and
at least one processor communicatively coupled to the microphone, the display, and the memory,
wherein the instructions, when executed by the at least one processor individually or collectively, cause the electronic device to:
obtain, based on a user voice being received through the microphone while a first user interface (UI) screen comprising a plurality of objects is being displayed on the display, text information corresponding to the user voice by inputting the user voice to a voice recognition model,
obtain, based on the text information, first information comprising information on a command and information on an execution target of the command comprised in the text information,
identify a variable area in which information displayed within the first UI screen is changeable and a constant area which is different from the variable area based on metadata on the first UI screen,
obtain, based on the metadata on the first UI screen, second information comprising information on functions corresponding to at least one object comprised in the constant area among the plurality of objects and information on texts comprised in the at least one object comprised in the constant area among the plurality of objects,
identify, based on a comparison result between the first information and the second information, whether a target object corresponding to the user voice is present from among the plurality of objects, and
control, based on the target object being identified, the display to display a second UI screen corresponding to the target object for performing an operation corresponding to the command.

2. The electronic device of claim 1, wherein the instructions, when executed by the at least one processor individually or collectively, further cause the electronic device to:
identify, based on the information on the execution target corresponding to a first text comprised in the plurality of objects, the target object comprised with the first text from among the plurality of objects as the target object.

3. The electronic device of claim 1, wherein the instructions, when executed by the at least one processor individually or collectively, further cause the electronic device to:
identify, based on the information on the execution target corresponding to a second text comprised in the plurality of objects, and the command corresponding to one function from among a plurality of functions corresponding to the plurality of objects, an object corresponding to the one function from among the plurality of objects as the target object.

4. The electronic device of claim 1, wherein the instructions, when executed by the at least one processor individually or collectively, further cause the electronic device to:
control, based on the target object not being identified, the display to maintain displaying of the first UI screen.

5. The electronic device of claim 1, wherein the instructions, when executed by the at least one processor individually or collectively, further cause the electronic device to:
control, based on the target object not being identified, the display to display a third UI screen for performing an operation corresponding to the command.

6. The electronic device of claim 1,
wherein a UI graph comprising a plurality of nodes corresponding to a type of a plurality of UI screens and a plurality of edges showing a connection relationship between the plurality of nodes according to an operation performed by a conversion between the plurality of UI screens is stored for each application in the memory, and
wherein the instructions, when executed by the at least one processor individually or collectively, further cause the electronic device to:
obtain, based on the target object being identified, a first embedding vector corresponding to the second information based on the metadata on the first UI screen,
identify a first node corresponding to the first UI screen from among the plurality of nodes based on the comparison result between the first information and the second information and a comparison result between the first embedding vector corresponding to the second information and a second embedding vector corresponding to the plurality of nodes, respectively,
identify, based on the information on the command and the information on the execution target of the command, a second node for performing the operation corresponding to the command from among at least one node which is connected to the first node, and
control the display to display the second UI screen corresponding to the second node.

7. A method performed by an electronic device, the method comprising:
obtaining, based on a user voice being received while a first user interface (UI) screen comprising a plurality of objects is displayed on a display of the electronic device, text information corresponding to the user voice by inputting the user voice in a voice recognition model;
obtaining, based on the text information, first information comprising information on a command and information on an execution target of the command comprised in the text information;
identifying a variable area in which information displayed within the first UI screen is changeable and a constant area which is different from the variable area based on metadata on the first UI screen;
obtaining, based on the metadata on the first UI screen, second information comprising information on functions corresponding to at least one object comprised in the constant area among the plurality of objects and information on texts comprised in the at least one object comprised in the constant area among the plurality of objects;
identifying, based on a comparison result between the first information and the second information, whether a target object corresponding to the user voice is present from among the plurality of objects; and controlling, based on the target object being identified, the display to display a second UI screen corresponding to the target object for performing an operation corresponding to the command.

8. The method of claim 7, wherein the identifying of whether the target object is present comprises identifying, based on the information on the execution target corresponding to a first text comprised in the plurality of objects, an object comprised with the first text from among the plurality of objects as the target object.

9. The method of claim 7, wherein the identifying of whether the target object is present comprises identifying, based on the information on the execution target corresponding to a second text comprised in the plurality of objects, and the command corresponding to one function from among a plurality of functions corresponding to the plurality of objects, an object corresponding to the one function from among the plurality of objects as the target object.

10. The method of claim 7, further comprising:
controlling, based on the target object not being identified, the display to maintain displaying of the first UI screen.

11. The method of claim 7, further comprising:
controlling, based on the target object not being identified, the display to display a third UI screen for performing an operation corresponding to the command.

12. The method of claim 7, further comprising:
obtaining a UI graph comprising a plurality of nodes corresponding to a type of a plurality of UI screens and a plurality of edges showing a connection relationship between the plurality of nodes according to an operation performed by a conversion between the plurality of UI screens;
obtaining, based on the target object being identified, a first embedding vector corresponding to the second information based on the metadata on the first UI screen;
identifying a first node corresponding to the first UI screen from among the plurality of nodes based on the comparison result between the first information and the second information and a comparison result between the first embedding vector corresponding to the second information and a second embedding vector corresponding to the plurality of nodes, respectively;
identifying, based on information on the command and information on the execution target of the command, a second node for performing the operation corresponding to the command from among at least one node which is connected to the first node; and
controlling the display to display the second UI screen corresponding to the second node.

13. One or more non-transitory computer-readable storage media storing computer-executable instructions that, when executed by at least one processor of an electronic device individually or collectively, cause the electronic device to perform operations, the operations comprising:
obtaining, based on a user voice being received while a first user interface (UI) screen comprising a plurality of objects is displayed on a display of the electronic device, text information corresponding to the user voice by inputting the user voice in a voice recognition model;
obtaining, based on the text information, first information comprising information on a command and information on an execution target of the command comprised in the text information;
identifying a variable area in which information displayed within the first UI screen is changeable and a constant area which is different from the variable area based on metadata on the first UI screen;

obtaining, based on the metadata on the first UI screen, second information comprising information on functions corresponding to at least one object comprised in the constant area among the plurality of objects and information on texts comprised in the at least one object comprised in the constant area among the plurality of objects;

identifying, based on a comparison result between the first information and the second information, whether a target object corresponding to the user voice is present from among the plurality of objects; and controlling, based on the target object being identified, the display to display a second UI screen corresponding to the target object for performing an operation corresponding to the command.

14. The one or more non-transitory computer-readable storage media of claim 13, wherein the identifying of whether the target object is present comprises identifying, based on the information on the execution target corresponding to a first text comprised in the plurality of objects, an object comprised with the first text from among the plurality of objects as the target object.

15. The one or more non-transitory computer-readable storage media of claim 13, wherein the identifying of whether the target object is present comprises identifying, based on the information on the execution target corresponding to a second text comprised in the plurality of objects, and the command corresponding to one function from among a plurality of functions corresponding to the plurality of objects, an object corresponding to the one function from among the plurality of objects as the target object.

16. The one or more non-transitory computer-readable storage media of claim 13, the operations further comprising:

controlling, based on the target object not being identified, the display to maintain displaying of the first UI screen.

17. The one or more non-transitory computer-readable storage media of claim 13, the operations further comprising:

controlling, based on the target object not being identified, the display to display a third UI screen for performing an operation corresponding to the command.

18. The one or more non-transitory computer-readable storage media of claim 13, the operations further comprising:

obtaining a UI graph comprising a plurality of nodes corresponding to a type of a plurality of UI screens and a plurality of edges showing a connection relationship between the plurality of nodes according to an operation performed by a conversion between the plurality of UI screens;

obtaining, based on the target object being identified, a first embedding vector corresponding to the second information based on the metadata on the first UI screen;

identifying a first node corresponding to the first UI screen from among the plurality of nodes based on the comparison result between the first information and the second information and a comparison result between the first embedding vector corresponding to the second information and a second embedding vector corresponding to the plurality of nodes, respectively;

identifying, based on information on the command and information on the execution target of the command, a second node for performing the operation corresponding to the command from among at least one node which is connected to the first node; and controlling the display to display the second UI screen corresponding to the second node.

* * * * *